H. BEHR.
MACHINE FOR USE IN MANUFACTURING SANDPAPER AND THE LIKE.
APPLICATION FILED NOV. 29, 1919.

1,364,827.

Patented Jan. 4, 1921.

INVENTOR
Herman Behr
BY
Edward S. Beach
ATTORNEY

H. BEHR.
MACHINE FOR USE IN MANUFACTURING SANDPAPER AND THE LIKE.
APPLICATION FILED NOV. 29, 1919.
1,364,827.
Patented Jan. 4, 1921.
7 SHEETS—SHEET 2.
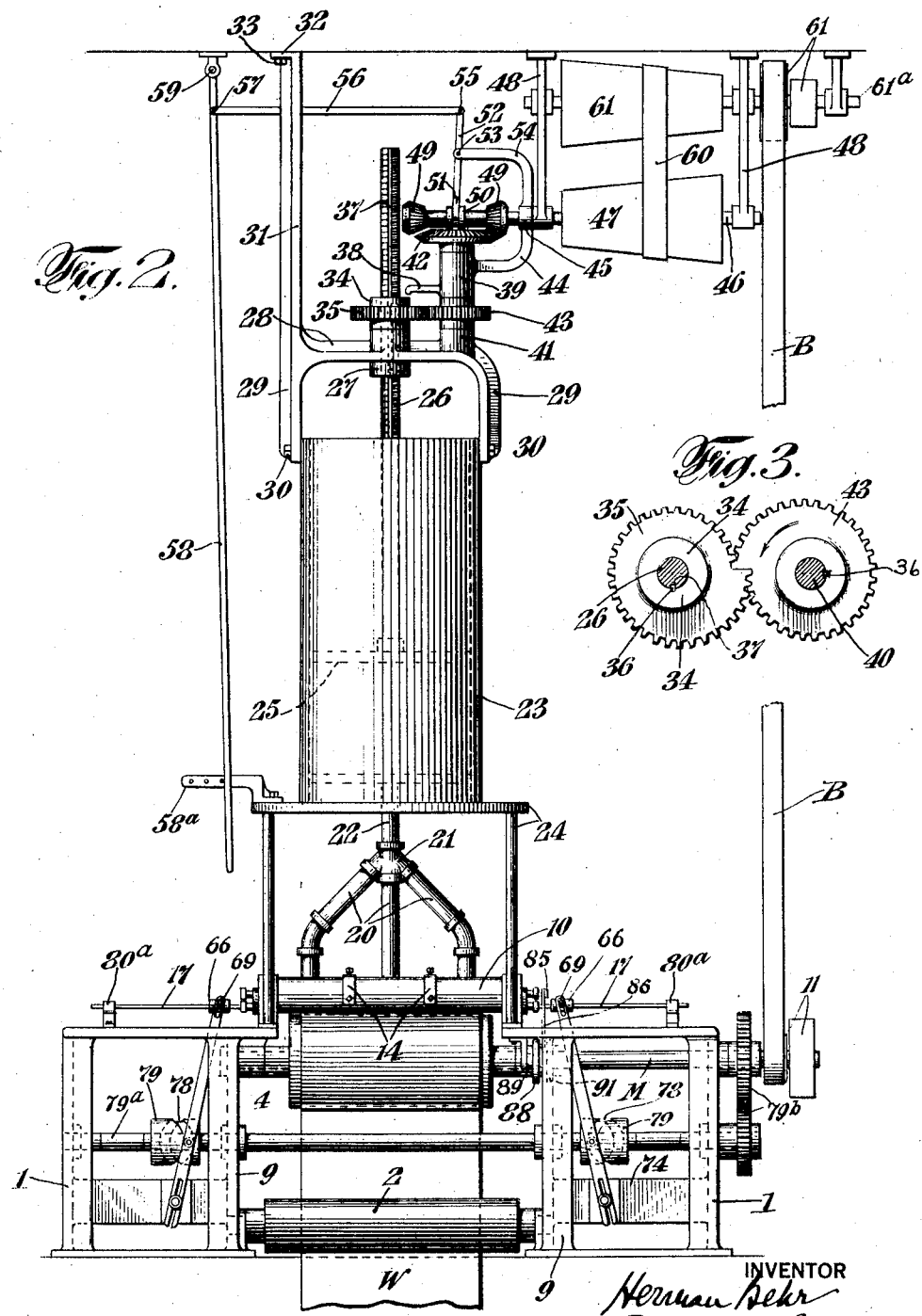

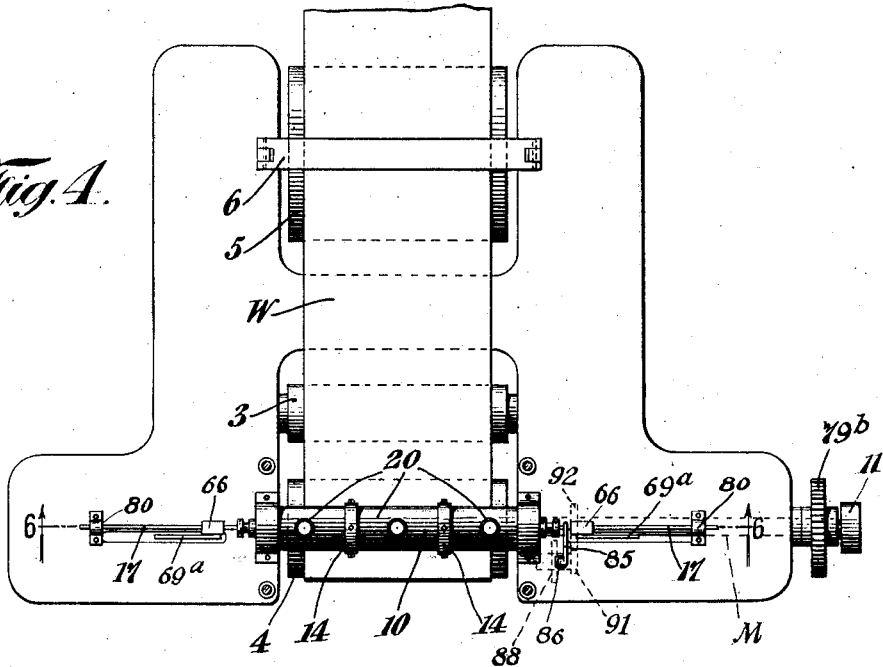
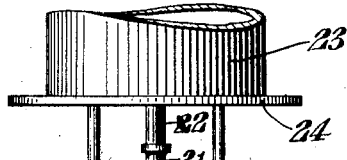
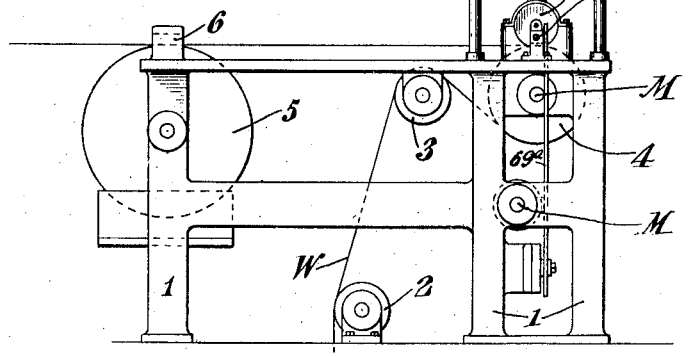

H. BEHR.
MACHINE FOR USE IN MANUFACTURING SANDPAPER AND THE LIKE.
APPLICATION FILED NOV. 29, 1919.
1,364,827.
Patented Jan. 4, 1921.
7 SHEETS—SHEET 4.
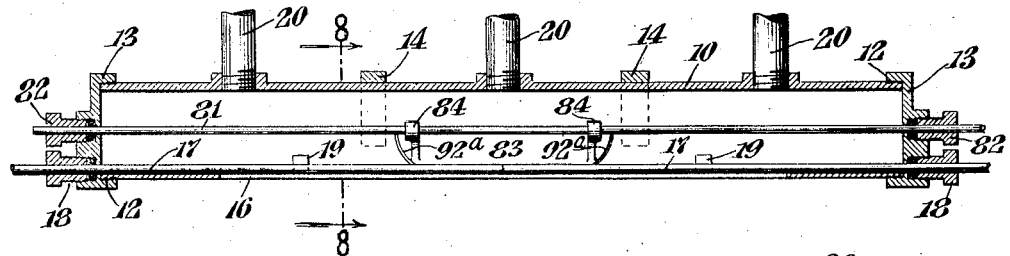
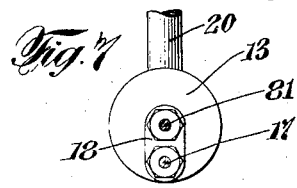
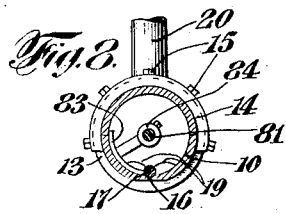
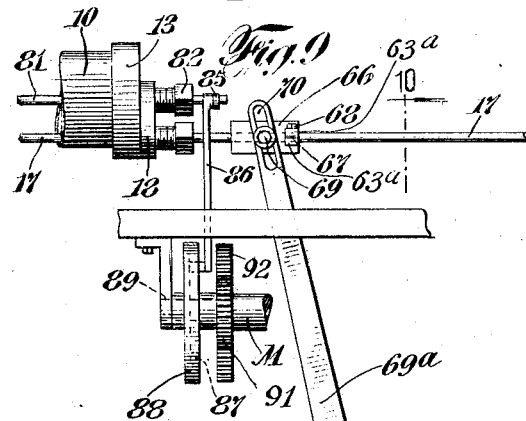
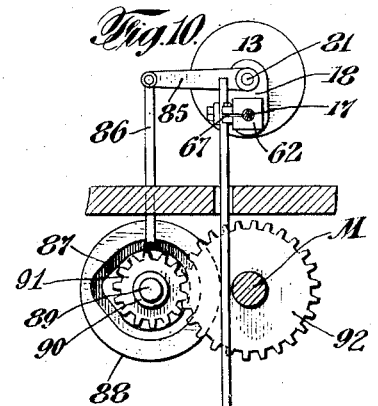
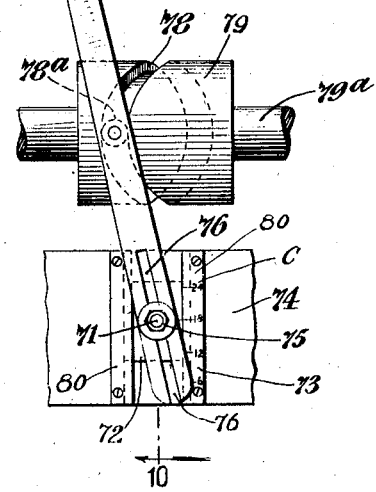
INVENTOR
Herman Behr
BY
Edward F. Beach
ATTORNEY H. BEHR.
MACHINE FOR USE IN MANUFACTURING SANDPAPER AND THE LIKE.
APPLICATION FILED NOV. 29, 1919.
1,364,827.
Patented Jan. 4, 1921.
7 SHEETS—SHEET 5.
*Fig. 11.*
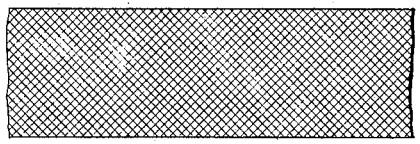
*Fig. 13.*
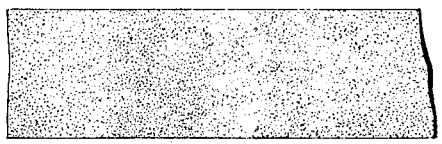
*Fig. 12.*
*Fig. 14.*
*Fig. 15.*
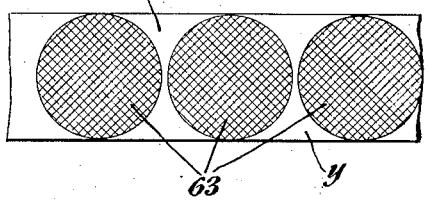
*Fig. 17.*
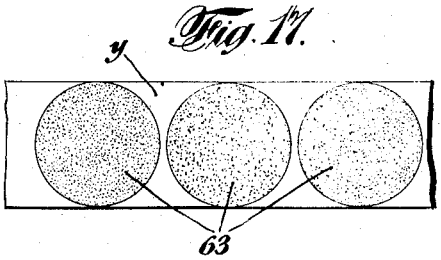
*Fig. 16.*
*Fig. 18.*
*Fig. 19.*
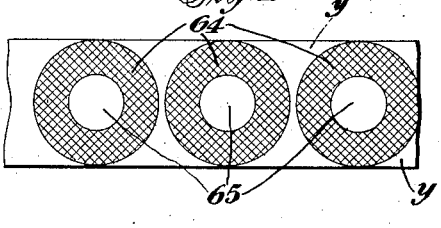
*Fig. 21.*
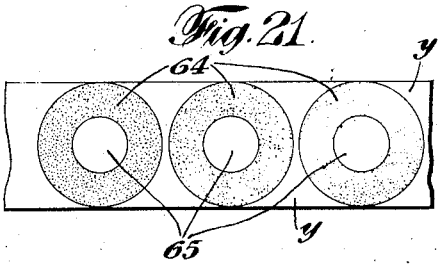
*Fig. 20.*
*Fig. 22.*
INVENTOR
Herman Behr
BY
Edward S. Beach
ATTORNEY H. BEHR.
MACHINE FOR USE IN MANUFACTURING SANDPAPER AND THE LIKE.
APPLICATION FILED NOV. 29, 1919.
1,364,827.                                           Patented Jan. 4, 1921.
                                                        7 SHEETS—SHEET 6.
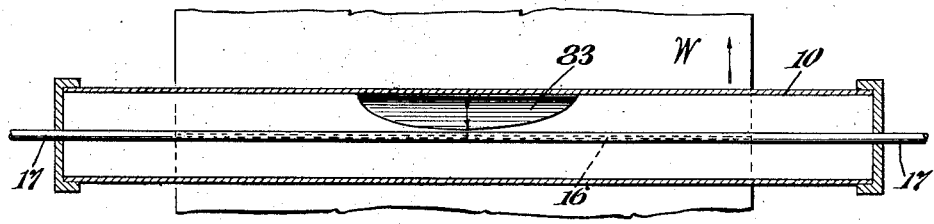
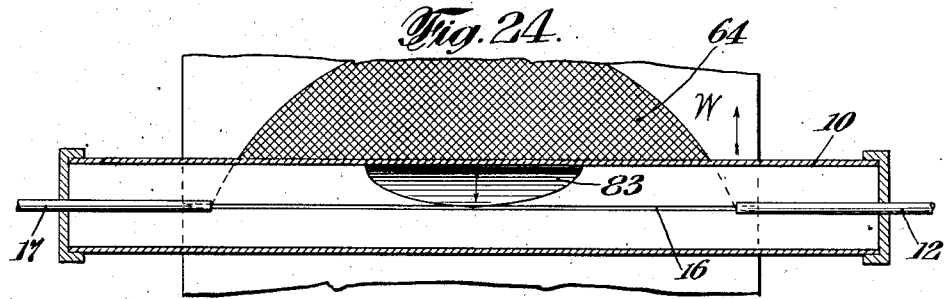
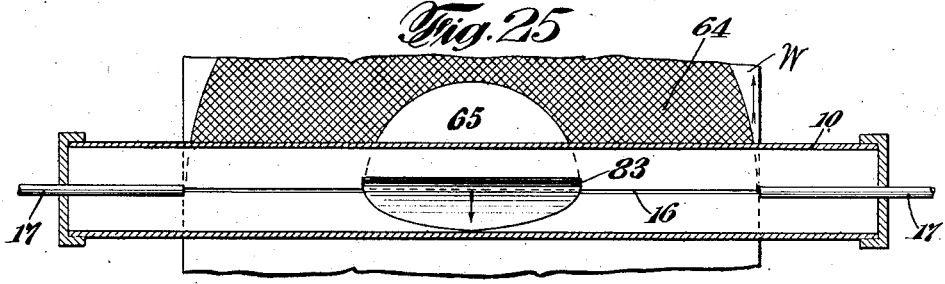
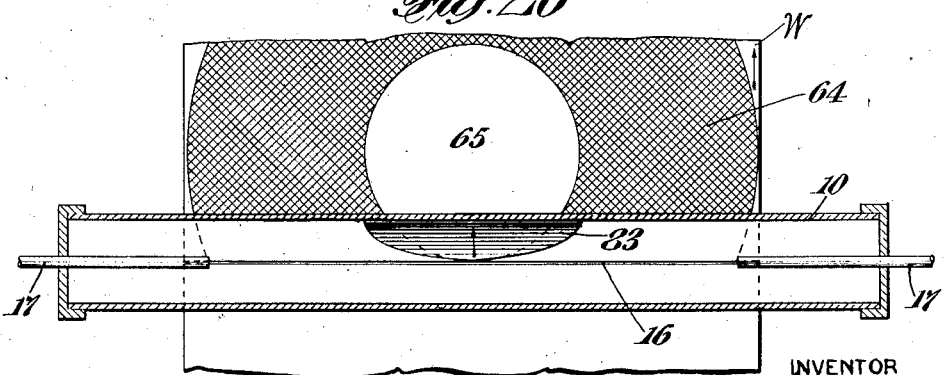
INVENTOR
Herman Behr
Edward S. Beach
ATTORNEY

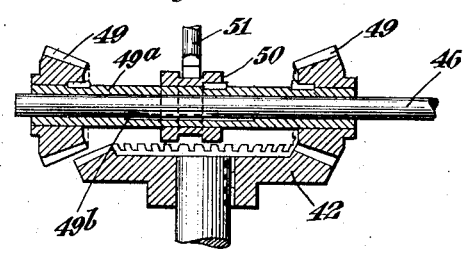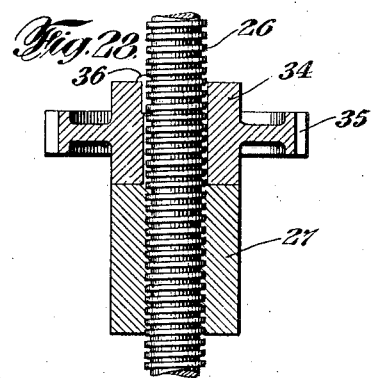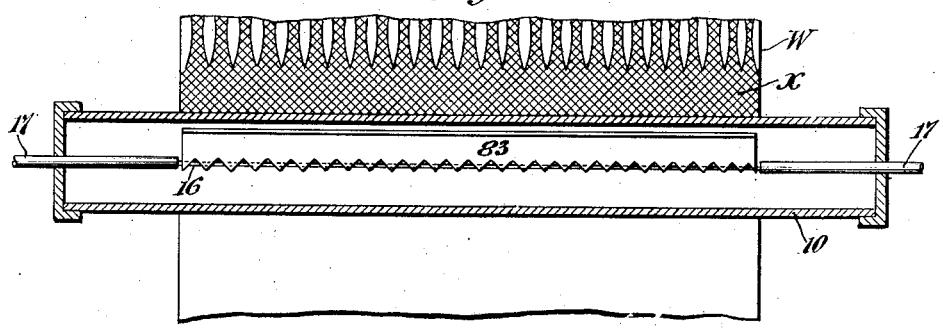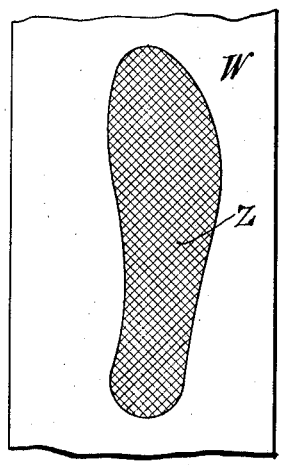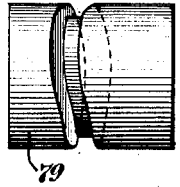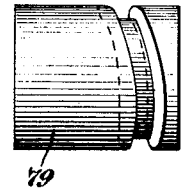

UNITED STATES PATENT OFFICE.

HERMAN BEHR, OF NEW YORK, N. Y., ASSIGNOR TO HERMAN BEHR & COMPANY, INCORPORATED, OF NEW YORK, N. Y., A CORPORATION OF NEW YORK.

MACHINE FOR USE IN MANUFACTURING SANDPAPER AND THE LIKE.

1,364,827. Specification of Letters Patent. Patented Jan. 4, 1921.

Application filed November 29, 1919. Serial No. 341,470.

*To all whom it may concern:*

Be it known that I, HERMAN BEHR, a citizen of the United States, residing in the city, county, and State of New York, have invented certain new and useful Improvements in Machines for Use in Manufacturing Sandpaper and the like, of which the following is a specification.

This invention relates to a machine for use in the manufacture principally of abrasive sheet material having flexible paper or textile fabric backing, either in long strips having abrasive material from edge to edge on one surface; or, in long strips having a series of abrasive disks spaced apart one from another; or, in long strips having a series of abrasive rings spaced apart one from another on one surface, as the case may be; such strips being adapted to be subsequently cut up into either sheets or disks or rings.

By abrasive is meant any abrasive or cutting material applied in fragmentary form; by glue or matrix is meant any suitable kind of adhesive; and by backing is meant any desired material on which the adhesive and thereon-deposited abrasive are superposed. All kinds of the abrasive material may be considered as included in the term sandpaper.

Among the objects of the invention are to produce a machine of the type now shown and which may be used in any one of three different ways at the will of the operator. First, the machine may be used for depositing adhesive either wholly or partially across the width of the backing preparatory to applying abrasive on such adhesive. Second, the machine may be used for applying the adhesive to the backing in disk form or in a series of successive disks, preparatory to applying abrasive to the adhesive disks. Thirdly, the machine may be used to deposit an annulus of adhesive or a series of such annuli on the backing, the disk-forming means in such case operating in conjunction with an arbor-hole stopper valve for preventing deposit of adhesive at the central sections of the disks so that at its such central sections the backing is left free of both adhesive and abrasive, and such sections may be cut to form arbor-receiving holes in the abrasive disks, the perimeters of which are also to be cut from the untreated backing.

I will first describe the machine with reference to the application of adhesive fully across the width of the backing which is preferably a long web, noting that heretofore great difficulty has been encountered in practice in obtaining uniformity of cutting material on successive runs of the sandpaper, though such successive runs have been intended to be of the same grade and quality as prior runs; and uniformity of successive runs is of very great importance in filling successive orders. The main cause of this highly objectionable lack of uniformity of product is mainly due to inexactitude in the thickness of the matrix or glue deposited on the backing prior to and preparatory for the application of the abrasive or cutting material, because the deposition of the latter in even and predetermined thickness of deposit is less difficult of control than is the uniform deposit of the matrix under actual working conditions.

One object of this invention is to improve the gluing apparatus in such a way that uniformity of glue deposit may be obtained with approximate certainty under working conditions, and this involves a very important saving of expense for glue or matrix consumed in the manufacture of products of the kind in question. The other objects of the invention relate to the production of abrasive disks with or without arbor-holes.

My new gluing apparatus, however, may be useful in many other operations where sheet materials are to be glued together as, for example, in laminated woodwork composed of superimposed veneer.

In the accompanying drawings forming part hereof and illustrating the principle of my invention in the best form now known to me of applying that principle.

Figure 1 is a side elevational, diagrammatic view, in part, of so much of a known sandpaper manufacturing apparatus as is necessary to be shown in connection with the present invention; and in part, of such apparatus when it embodies features of this invention. The view shows in end elevation, looking from a side of the machine, my new gluing apparatus with a web of backing running through it and past means for application of abrasive on the previously deposited layer of adhesive on the upper surface of the web; the usual pneumatic web-feeding drum being also shown. In this diagrammatic view, the glue-depositing cross-head is shown above its normal working position which is illustrated in other figures following.

Fig. 2 is a front elevation of my new gluing apparatus, an end view of which is partially indicated in Fig. 1.

Fig. 3 is a plan view of a pair of intermeshed scroll gears shown in Fig. 2, and forming part of mechanism for forcing the adhesive under pressure, on the backing.

Figs. 4 and 5 are, respectively, a partial top plan and a partial side elevation of the machine shown in Fig. 2.

Fig. 6 is a lengthwise sectional elevation at line 6—6 of Fig. 4 of the transverse, lengthwise-chambered glue-depositing cross-head which forms a part of the gluing apparatus; this view showing the lengthwise-extending glue-escape slit of the glue-depositing crosshead closed by endwise-slidable rod-valves; and also showing in side elevation, the arbor-hole stopper-valve hereinafter mentioned.

Figs. 7 and 8 are, respectively, an end and a vertical sectional view of the glue-depositing crosshead, Fig. 8 being in section at line 8—8 of Fig. 6 and showing one of a pair of the rod-valves and an end elevation of the arbor-hole stopper-valve.

Fig. 9 is a front elevation of one of two identical cam-controls for one of the two identical reciprocable rod-valves contained in the glue-depositing crosshead.

Fig. 10 is an elevational view, partly in vertical section at line 10—10 of Fig. 9, and further illustrates one of said controls, and also the mechanism for operating the arbor-hole stopper-valve.

Figure 1:
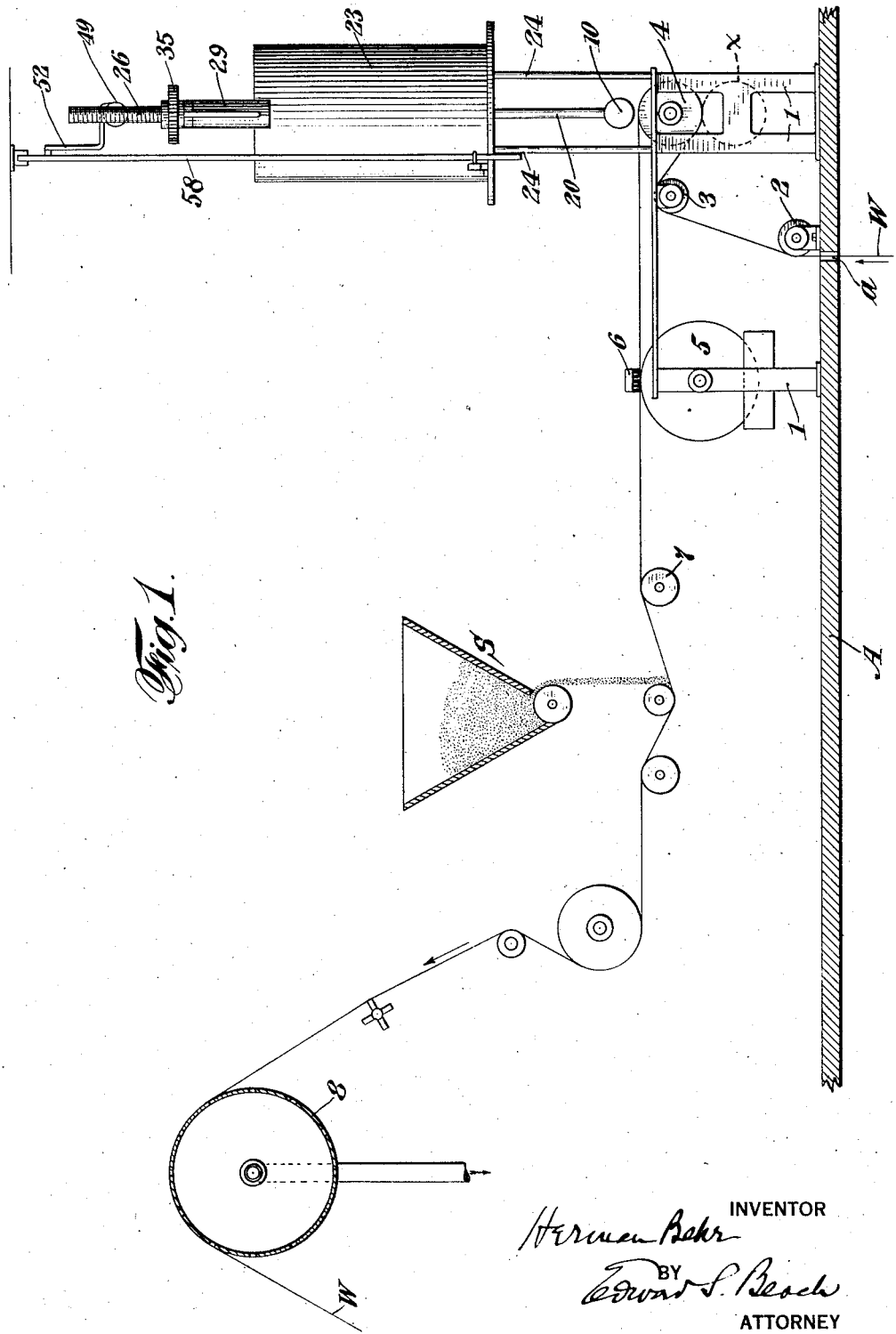

Figs. 11 and 12 are respectively a plan view and an edge view of a portion of a web of backing having a deposit of adhesive from edge to edge of one surface; and Figs. 13 and 14 are views corresponding to Figs. 11 and 12 but showing the abrasive in place on the adhesive.

Figs. 15 and 16 show in plan and edge view a series of disks of adhesive spaced apart on the backing; and Figs. 17 and 18 are corresponding views showing abrasive in place on the adhesive disks shown in Figs 15 and 16; the disks of adhesive and abrasive to be cut from the backing for completion of the product.

Figs. 19 and 20 show in plan and edge view, rings of adhesive spaced apart on the backing; and Figs. 21 and 22 are corresponding views showing abrasive on the adhesive rings shown in Figs. 19 and 20; the central sections of the backing inclosed by the adhesive and abrasive to be cut out to form holes for reception of tool arbors or shafts; and the perimeters of the rings to be cut free of the backing for completion of the product.

Figs. 23 to 26 inclusive are a series of diagrammatic views illustrating different successive stages of the relative positions of the rod-valves and arbor-hole stopper-valve for formation of a ring of adhesive on the backing.

Fig. 23 indicates the opposed ends of the rod-valves in contact and closing the exit slit of the glue-depositing crosshead; by an arrow indicates that the web is traveling rearwardly; and by another arrow indicates that the arbor-hole stopper-valve is traveling downward and forward. The rod-valves are about to be separated for beginning the rear edge deposit of adhesive from the crosshead.

In Fig. 24 the web has traveled rearward; a portion of a disk of adhesive has been deposited on the web in consequence of the increasing separation of the free ends of the rod-valves; and the forward rear edge of the arbor-hole stopper-valve has moved downwardly and forwardly until its crown is alined with the exposed adhesive-exit slit of the crosshead where the rear bend of the arbor-hole section of the backing is to begin, at a point removed rearwardly from the center of the disk of adhesive under formation.

In Fig. 25 the web has traveled farther to the rear; the opposed ends of the outwardly-moving rod-valves are shown separated at the transverse diameter of the partially formed ring and concentric arbor-hole section, the outward movement of the disk-forming rod-valves having been arrested; a rearward portion of the arbor-hole section is shown free of adhesive; and the arbor-hole stopper-valve is shown farther forward.

In Fig. 26 the web of backing has traveled still farther rearward; a greater portion of the disk of adhesive has been formed by approachment of the opposed ends of the rod-valves, subsequent to their position at the diametric position shown in Fig. 25; and the free front edge of the arbor-hole stopper-valve has moved upwardly and backwardly as indicated by the arrow thereon in Fig. 26.

Fig. 27 is a vertical central sectional detail of the construction of the reversing gear mechanism shown in Fig. 2 with the threaded piston rod rising from the piston in the container for the adhesive, the reversing gears being shiftable into inoperative positions relative to a beveled gear shown on the threaded piston rod.

Fig. 28 is a vertical sectional detail showing said threaded piston rod threaded through a stationary nut which is a portion of a bracket shown in Fig. 2, and of the inoperative connection of one of the scroll gears shown in Fig. 3 with the threaded piston rod for turning it in its said nut.

Fig. 29 shows an elongated stopper valve or shield provided with a serrated front edge and a deposit of irregular form different from the forms of deposit shown in Figs. 15 to 22 inclusive.

Fig. 30 shows a still different form of deposit in the shape of a shoe sole; and Figs. 31 and 32 show a pair of pattern cams having grooves dimensioned to move the rod valves for effecting the shape of deposit shown in Fig. 30.

Referring to that form of the invention shown in the drawings, 1 indicates upstanding side frames of the gluing machine; 2 a transverse roll past which the web W of flexible backing runs upwardly through a transverse slot $a$ through the floor A on which the machine is located; 3 indicates a transverse upper roll for the web which is led over it and forwardly and downwardly under and thence upwardly and rearwardly over a transverse, front web-supporting roll 4 which is the preferable form of work-support, or support for the material to be treated. From roll 4 the web is shown extending rearward over a transverse drum 5 with the upper surface of the web in contact with a transverse wiper 6, the web with its upper surface faced with adhesive running over a transverse supporting roll 7, and thence under means for depositing abrasive on the adhesive on the backing and shown as the usual sander S, and thence over a pneumatic-suction web-feed drum 8 by which the web is continuously pulled from the web-supporting roll rearwardly under the sander, and thence to the festooning mechanism referred to but not shown. In Fig. 1, I show in dotted lines $x$, the old gluing roll that ran in a glue trough and deposited the glue or matrix on the web as it turned upward over the front, web-supporting roll 4. Said glue-roll $x$ and its trough are now dispensed with and the upper surface of the web W at the upper peripheral crown of the roller 4 has the adhesive deposited on it by a lengthwise-chambered glue-depositing crosshead, parallel to and extending lengthwise of the upper peripheral crown of roll 4.

The gluing machine is shown provided with inward upstanding posts 9 each of which is transversely alined with an outward upstanding side frame 1. The usual revoluble shaft M of the web-supporting roll 4 constitutes the main-shaft of the gluing machine, but in the present case is prolonged at one end of roll 4, the prolongation having a bearing in each frame member 1 and 9 (Fig. 2). Said glue-depositing crosshead is indicated by 10. The shaft M is equipped with a belt pulley 11 for application of power. The glue-depositing crosshead is formed of a lengthwise-split tube the ends of which are exteriorly screw-threaded at 12, each end of the split tube being provided with a screw cap 13 on its threaded end; and the members of the split tube are otherwise held in tubular assemblage by arcuate clamps 14 and screws 15 through the arcuate clamps, the free ends of each clamp embracing the upper split tube member and extending downwardly into engagement with upper opposed portions of the under split tube member which is formed at its bottom crown portion with a lengthwise-extending glue-exit preferably in the form of a continuous slit 16 from which the adhesive is pressed out evenly and under regulable pressure upon the upper surface of the web while it is in continuous rearward travel from the front, web-supporting roll 4 and has its upper surface coated with glue from edge to edge or between its edges, according to the adjustment of the lengthwise-alined, endwise-movable, rod-valves 17 each of which projects into the chamber of the glue-distributing crosshead through a stuffing box 18 with which each cap 13 is provided in its lower portion, the inward end portion of each rod-valve passing between interior side guides 19 between which the rod-valves work. The guides 19 are fixed to the interior bottom wall of the under split member of the glue-distributing crosshead, and are located adjacent and some at one side and others at the other side of the exit slot 16. The under surface of each rod-valve works in close contact with the inner wall surfaces adjacent the slot 16.

The rod valves may be pushed in wholly or partially to close the slot 16; and may be pulled out by hand when desired to open up the exit slot 16 to any desired length, according to the width of the web to be faced with the adhesive or to the width of the adhesive to be deposited on the web.

For obtainment of a determinable thickness of adhesive on the web surface to be treated, and in order to secure uniformity of thickness of the deposited adhesive, the glue-depositing crosshead is, preferably and by one feature of this invention, supplied with adhesive which is under a forced and constant pressure feed that is regulable by means of variable-speed and piston mechanisms whereby, for a given quality of adhesive at a given temperature, with the web traveling at a predetermined speed, and with the controllable forced feed adjusted to a known operating condition, it is practical not only to deposit the adhesive uniformly on either all or selected parts of a length of web in its travel; but also, for subsequent repeat orders, similarly to deposit the adhesive on other webs, corresponding in thickness of deposit to the condition of earlier-treated webs. To this end, the distributing crosshead 10 is connected at its upper side with preferably branched conduit members 20 connected at their tops with a union 21 which, at its top, is connected with a conduit 22 dependent from the bottom of a main and cylindrical upstanding container 23 for the adhesive or glue, this container being supported on the top of an upstanding frame member 24 above and over the distributing crosshead, the container 23 holding the supply of adhesive for the distributing crosshead. The branched conduit members 20 as shown are three in number, the outermost members severally connecting with the distributing crosshead near an end thereof and the intermediate branch member connecting with the distributing crosshead midway between its ends. In this way close uniformity of supply of adhesive to the chamber of the transverse distributing crosshead is obtainable. The upstanding main cylindrical container 23 is open at its top and provided with a piston 25 descent of which forces adhesive into the distributing crosshead through said conduits. The piston is provided with an upstanding threaded piston-rod 26, the lower end of which is fixed to the piston which, by the present construction, is given a rotary movement whenever it is moved downwardly or upwardly in the container 23. The threaded piston rod extends upwardly through a nut portion 27 of a top bracket 28 having dependent arms 29 which opposedly embrace the upper end of the container 23, the latter being detachably secured to the bracket arms by set-screws 30. This bracket 28 has an upwardly-extending arm 31 provided with a horizontal lug 32 through which bolts 33 pass into the ceiling of the room of installation; but the bracket may be, if desired, otherwise rigidly installed. Above the bracket 28, the threaded piston rod 26 extends upwardly through the hub 34 of a scroll gear 35, the hub bore being provided with an interiorly projecting feather 36 which is entrant in a groove 37 formed lengthwise of the piston rod 26. I prefer the intermeshing scroll gear construction to an intermeshing spur-gear construction because as scroll gears are now successfully made, it is found that their action is steadier than that of intermeshing spur-gears. Moreover it is preferable to provide a means, such as the scroll gear movement shown, whereby as the length of the exit between the rod-valve ends increases and diminishes in the formation of gluey disks, the pressure exerted by the piston on the glue will be slightly increased as the advancing first half of the disk to be formed is progressively formed by flow of glue through the progressively increasing extent or length of the exit between the rod-valve ends; and be slightly decreased as the advancing second or rear half of the disk is progressively formed by flow of the glue through the progressively decreasing length of the exit between the rod-valve ends. As shown in Fig. 3, the upper half of each intermeshed scroll gear, above a transverse diametric line through their centers, has a smaller radius than the bottom or under half in the drawing; and consequently the rotation of the threaded piston-rod 26 is higher when the scroll gear peripheries having a lesser radii are in mesh than is the case when the scroll gear peripheries having a greater radii are in mesh. As the web is advanced under the distributer the rod-valves are progressively moved apart and a greater piston pressure is then exerted on the glue in consequence of the travel in mesh of the scroll gear peripheries of the shorter radii. When the first advancing half of the gluey disk has been formed, the scroll gears will have rotated about 180°, and during the completion of the rear half of the advancing disk formation, during the movement of the inner ends of the rod-valves one toward another, the scroll gears will travel more slowly because of their greater radii. When the piston travel is greatest, the pressure thereof is greatest, and when the piston travel is slowest its pressure is least. In other words, the scroll gear movement serves to increase pressure on the glue as the area or length of the exit is increased and to decrease pressure on the glue as the area of the exit decreases. Rotation of the scroll gear 35 in one direction compels rotational descent and in the other direction compels rotational ascent of the piston in the cylindrical container 23. The under end of the scroll gear hub 34 bears on the upper end of the nut 27 of bracket 28 and the gear 35 is kept from rising by a lug 38 that projects from a bracket sleeve 39 in which a vertical shaft 40 has a bearing, the foot of this shaft running in an upstanding bearing 41 integral with the bracket 28. The free end of lug 38 is adjacent the top of the scroll gear hub 34. The upper end of shaft 40 carries a horizontal bevel gear 42 and has fixed to it, between the bearing 41 and the bracket sleeve 39, a scroll gear 43 which is in constant mesh with the scroll gear 35. Rotation of bevel gear 42 in either direction will thus impart movement to the scroll gears 43 and 35 and through the latter to the piston rod 26. The bracket sleeve or bearing 39 is shown with an upstanding U-shaped bracket extension 44 the recess of which is opposed to the upper part of the piston rod 26 which is made of sufficient length to permit the piston to be moved closely to the bottom of container 23 with the piston rod at all times in connection with the scroll gear 35.

The vertical portion of the U-shaped bracket extension 44, between its ends, is formed with a horizontal bearing at 45 for the horizontal shaft 46 of an under cone pulley 47 supported in the lower ends of a pair of hangers 48 shown fixed to the ceiling in a usual way. The cone pulley shaft 46 projects over the bevel gear 42 and is provided with a pair of bevel, reversing gears 49 spaced apart on the shaft and which are to be brought one at a time into mesh with the bevel gear 42 to rotate the latter in the desired one of its two rotational directions. Between these reversing gears 49, the shaft 46 is provided with a peripherally grooved collar 50, the arms 51 of a forked shifting lever 52 working in the groove of the collar, and the lever being pivoted at 53 on the upper arm 54 of the upstanding bracket 44. The upper end of the shifting lever is pivotally connected at 55 to an end of a connecting rod 56, above the machine, the other end of the connecting rod being pivoted at 57 to a dependent hand lever 58 the upper end of which is pivoted at 59 to a ceiling fixture. By manipulating the hand lever 58, either of the two reversing gears 49 is brought into and the other carried out of mesh with the bevel gear 42 for changing the direction of rotation and consequently the vertical movement of the piston rod 26, without changing the direction of rotation of the cone shaft 46, the cone 47 on which is driven by a belt 60 from an upper power drive cone 61, the pair of cones and belt being a well-known form of change-speed mechanism. The shaft of cone 61 is provided with a pulley 62 from which a belt B goes to the pulley 11 of main shaft M.

The mechanism above described is, all things considered, the best form of embodying my invention now known to me, for application of an adhesive to the traveling web from edge to edge or between the edges of the latter, preparatory to application of the cutting or abrasive material and the subsequent operations of sizing and drying by carriage in the usual festooning apparatus to the delivery drum.

It is equally important, in the manufacture of abrasive disks or rings, to apply the adhesive under regulable control for obtainment of uniformity of adhesive in successive runs of web; and my present invention broadly considered is applicable to the manufacture of either abrasive disks or rings in the production of which a wholly new and economically important method of manufacture is involved. The machine which I have above described constitutes an invention which in one sense is wholly distinct from other features of my invention now to be described, and which are herein described because the machine shown is a machine which may be used at will for either gluing the web wholly or partway across its width as required in the manufacture of abrasive sheets as distinguished from disks; or for depositing the adhesive in the form of either disks or rings for subsequent reception of abrasive or cutting material.

The prior common practice in the manufacture of abrasive disks is to apply the adhesive to the backing, then to apply the abrasive and size and dry; and afterward to punch the center arbor-holes, cutting the completed rectangular sheets into disks and cutting the arbor holes in the disks and through the abrasive glued thereon. In usual large-scale operations, great quantities of adhesive and of abrasive are wasted by such procedure. As is well known, abrasive disks vary in diameter from sizes suitable for dental work in the human mouth to say 36 inches, more or less, when such disks are wanted for metal and wood working. By the construction and mode of operation about to be described, I may apply the adhesive to the traveling web either in successive independent disks 63, or in rings 64 (Figs. 15 to 21).

If the application of adhesive and superposed abrasive is made in the form of a disk, then usually a center arbor-hole 65 will have to be punched through such disk, and yet abrasive disks as distinguished from abrasive rings may be useful. However, what I herein call abrasive rings are commercially designated as abrasive disks; and it is therefore preferred to deposit the adhesive and abrasive in the form of rings 64, the peripheries of which are coincident with the edges of the web, and subsequently to punch the arbor holes through the untreated backing, and cut the abrasive rings from the web.

Brief consideration will make it clear that if the contacting opposed ends of the rod valves 17 are gradually separated during a rearward travel at proper speed of the web, the outflowing adhesive, through the exit 16 of the distributing crosshead, will take the shape of a semi-disk, the crown edge of which will be rearward; and that by following up such gradual separating movement, after the transverse diameter of the disk has been reached, with a gradual approaching movement of the opposed ends of the rod valves, the remainder of a disk will be formed.

It is not essential that the perimeter of the disks be mathematically exact or be precisely coincident with the edges of the web; the perimeter may be more or less jagged, but such disks of deposited adhesive should have diameters slightly in excess of the diameter of the tubular punches subsequently used to separate the completed, abrasive disks from the intervening portions *y* of the web. The appropriate movements of the rod-valves 17 are very simply obtainable as follows. Each rod valve 17, outwardly of the distributing crosshead 10 is provided with a collar 66 which is preferably lengthwise-adjustable on the rod-valve. For this purpose the collar has a split end, formed by an end slot as at 67, and opposed laterally projecting ears 63ª the opposed walls of which are spaced apart by the slot. A screw 68 threaded through holes in the ears suffices to pinch the collar in an adjusted position on the rod valve.

Each collar is provided with a projecting pin 69 working in the elongated lengthwise-extending slot 70 in the upper end of a vertically-disposed cam-controlled lever 69ª the foot of which near the base of the machine is pivoted by a pin 71 on an adjustable slide block 72 mounted in vertical ways 73 on a frame member 74. The bottom pivot pin 71 is fixed in the slide block, its outer end being threaded for reception of a clamp nut 75. The lower end of the lever 69ª is lengthwise slotted at 76 and forks over the pin 71, bearing on a shoulder 77 on which the slotted end of the lever is clamped by the clamp nut 75. By adjusting the position of the slide block, the throw of both levers 69ª may be varied, and as the vibrations of each are controlled by the pitch of an endless cam groove 78 in a rotary cam 79 mounted on a countershaft 79ª rotated by the intermeshed spur gears 79ᵇ, one on main shaft M and the other on the countershaft 79ª (Fig. 2), it follows that the alined rod-valves 17 may be reciprocated to cause their opposed ends to separate and to approach, as may be desired: the adhesive being forced out of the exit 16 according to the varying lengths of such exit occasioned by the separating and approaching movements of the alined rod-valves.

Each lever 69ª is provided with a cam roll 78ª working in the cam groove 78. Thus disks of adhesive of any desired diameter may be deposited on the traveling web, the opposed ends of the rod-valves being brought temporarily into contact to close the exit 16 temporarily while the web travels a slight distance to form the space *y* between the disks. Each lever 69ª co-operates with a cam 79, the contour of the groove 78 in each of which determines the throw of the lever and consequently the diameter of the disk of adhesive to be deposited, but one of the pair of marginal guide-plates 80 for each slide block 72 is shown calibrated, in Fig. 9, at C to indicate different diameters of the disks of adhesive for production of which the levers 69ª may be differently adjusted without changing the cams 79 from one size to another.

It is here noted that when the machine is to be used for gluing the web continuously from edge to edge or partway from edge to edge, as first above described, the levers 69ª are disconnected from the rod-valves 17, so that the latter may be separated by hand and remain separated until it is desired to close the exit 16 of the distributing container. Such disconnection may be effected by removing the pins 69 or better by removing the levers 69ª from the machine, for it is only when disks or rings are to be formed that the levers 69ª are used. The outer end of each rod-valve is supported in an upstanding side bearing 80ª.

For the reason that there is economy in depositing the adhesive in ring form rather than in disk form, especially in the larger sizes of abrasive disks, the machine is provided with an automatically controlled valve for stopping the exit 16, midway between its ends, in order to form the unglued arbor-hole portions 65 of the successive disks formed in series on the web, as described, and while the disks proper are being successively formed.

For this purpose, the glue-distributing crosshead 10 is provided (Fig. 6) with a lengthwise-extending rocker-shaft 81 journaled in stuffing boxes 82 on the screw caps 13. The mid-section of this rocker shaft is provided with an arcuate stopper-valve 83 by means of rocker arms 84. The stopper valve as shown is a portion of a metal disk having concavo-convex surfaces and is detachably connected to the rocker shaft. The stopper valve may be of any desired dimension, to suit the diameter of the arbor-hole space 65 which it is desired to produce in the formation of a disk by controlled separation and approach of the opposed ends of the rod-valves.

One end of the rocker-shaft 81 projects beyond an end of the glue-depositing crosshead and is provided (Figs. 9 and 10) with a rocker arm 85 from the free end of which a thereto pivoted link 86 depends, its lower end having a cam roll working in an endless cam groove 87 in the face of a cam 88 fixed on a shaft 89 which is journaled (Fig. 2) in front of the main shaft M, in frame members 1 and 9. The hub 90 of the cam 88 is formed (Fig. 10) with a pinion 91 which is in mesh with a spur gear 92 on the main shaft M from which the cam 88 and its shaft 89 are rotated. The contour of the cam groove 87 determines the time during which the stopper valve 83 will be closed between the opposed ends of the rod-valves 17, and returned into inoperative position with its inner and forward free edge rearward of the exit 16. The convex wall of the stopper valve 83 is in sliding contact with the inner wall of the under tube member of the glue-distributing crosshead 10 and in its movements, imparted by the cam groove 87, at times works between the opposed ends of the rod-valves 17 to cover or uncover to a constantly varying length, the glue exit 16, between the rod-valve ends.

The operation is:

As the web travels rearwardly, the stopper-valve 83, which is a form of slide valve, is initially in its lifted and inoperative position with its free forward edge back of and above the exit 16; the contacting ends of the rod-valves are separated for starting the formation on the web of a disk of adhesive, the formation of such disk being commenced at its rearward edge or bend. The rod-valve separating movement continues until the transverse diameter of the disk of adhesive under formation is reached by the rearward travel of the web, but when the rear edge of the arbor-hole space is reached by the rearward travel of the web, a portion of the disk of adhesive having been meanwhile formed rearward of the arbor-hole space, the stopper-valve moves downwardly and forward and begins to cover the exit 16 continuing the covering movement while the rod-valves are continuing in their separating movement up to the time when the transverse diametric line of the disk of adhesive and of its central arbor-hole space are being formed; and then, the web still continuing its rearward movement, the opposed ends of the rod-valves gradually approach and the stopper-valve gradually recedes so that the forward half of the disk and of the arbor-hole space are continuously formed, the final rearward movement for carrying the stopper valve out of covering relation to the exit 16 occurring when the front point or bend of the arbor-hole space is completed. The approaching movement of the opposed ends of the rod-valves continues until the forward edge or point of the disk of adhesive is completed. This is readily accomplished by a proper mechanical layout of the cam grooves 78 and 87. The edges 92ª of the stopper-valve 83, shown in Fig. 6, are struck on a circle corresponding to the diameter of the required arbor-hole dimension. The edges 92ª indicated in Fig. 6 are a part of the intermediate forward free-edge arc of the stopper-valve.

The cams 79 and 88 have their respective cam grooves 78 and 87 so formed as to produce a dwell of the rod-valves 17 with their edges in contact for closing the exit 16 during the time required for spacing the disks apart as at $y$.

For the reason that when the meeting ends of the rod valve 17 are initially moved apart, the adhesive if under pressure may jet out through the then more or less open exit slit 16 to the detriment of the desired character of deposit of the adhesive on the web, the beveled shifting-gears 49, and the shifting apparatus connected therewith are so constructed that said gears may be given an inoperative or neutral position out of contact with the beveled gear 42. To this end, as shown in Fig. 27, the beveled gears 49 are each fixed on a sleeve 49ª carrying the grooved shifting collar 50 and spaced apart on the sleeve by a distance in excess of the diameter of the beveled gear 42, the sleeve 49ª being splined by a lengthwise-extending feather 49ᵇ to the shaft 46 so that the gear-carrying sleeve is coupled to rotate with the shaft 46 but may be moved lengthwise thereon by manipulation of the hand lever 58 for bringing the beveled gears 49 into neutral position relatively to the gear 42, or to bring either of the two gears, one at a time, into coöperating mesh with the beveled gear 42. For the lower accessible end of the hand lever 58 a bracket 58ª having projecting teeth or pins forming a kind of rack in which the lower end of the handle may be caught and fixed, is provided.

The shaft 61ª on which the cone pulley 61 is fixed may be a member, and desirably is a member, of the driven line shafting, and is so shown; and as it is preferred to drive the main shaft M directly from the line shafting instead of indirectly from the cone pulley shaft 46 as obviously might be done, the pulleys 62 and 11 are each shown as step pulleys whereby the belt B may be shifted and the rotational speed of the main shaft varied at will to suit working conditions.

The contour of the endless cam grooves in the revoluble cams 78 which are pattern cams in effect, may be widely varied for the purpose of widely varying the timing of the reciprocation of the rod valves 17 either or both, for deposit of adhesive on the web in various forms other than across the width of the web. The pattern cams 78 may be removed and replaced by other cams having a different pattern style of cam or cam grooves; and I do not intend to limit all the appended claims either to abrasive products or to adhesive products of the pattern style set forth. And in connection with the described rockable stopper valve 83 it is noted that its edge contour may be widely varied; that its dimension may be increased or diminished relatively to the length of the exit slot 16, and that its movements may be variously timed according to the contour of the cam 87 from which as a pattern cam the rockable stopper valve 83 is actuated. Instead of adhesive, my new machine may be used for the deposit on a web of paint or color or other matter, in a considerable variety of forms and shapes of deposit. It will be observed that the valve rods 17 are positively actuated. When disks or annuli are to be made, the transverse wiper 6 which is used when adhesive is deposited across the width of the web, is to be removed to prevent spreading of the adhesive disk or annular deposits of adhesive.

The method which may be practised by use of the above-described mechanism is set forth in my application Serial No. 341,472, filed November 29, 1919.

One of the important features of this invention consists in depositing on the web adhesive through an adhesive-exit, with the adhesive supply under pressure, because there is thereby obtained on the web a deposit of adhesive of more body than is ordinarily obtainable from a transfer roll such as heretofore used; and this body of deposit is in respect to thickness readily controlled by the operator of the machine, who, while the web or backing is in its continuous feed movement rearwardly, may by manipulation of the accessible hand lever 58 arrest the pressure on the adhesive in container 23 and thereby prevent the liquid contents of the container from spurting or jetting out when the exit 16 is initially opened, or at any other time; and may also vary the pressure at will to suit different working conditions dependent on temperature, hygrometric and other conditions of the container contents and of the backing. A catch bracket 58ª is provided for the lever 58 so that it may be held at will in an adjusted position relatively to either of the two working, or the non-working neutral positions of the reversing gears 49 to the gear 42. Either member 10 or 13 is a liquid-holder, and together they form a distributer.

In Fig. 29 the rod valves 17 are shown separated to uncover the exit 16 for the full width of the web or backing W; the stopper valve or reciprocating shield 83 being elongated and provided with a serrated front edge 83ª whereby the adhesive or other fluid in the container will be deposited as shown by pattern $x$ on the web. This merely illustrates one of many contours or shapes which may be given to the member 86 with variant effects on the shape of the deposit.

Another example of a change of form is shown in Fig. 30 where the web W appears with a deposit $z$ of the shape of a shoe sole. By making the contours of the cam grooves of the form shown in the pattern cams shown in Figs. 31 and 32, the rod valves 17 may be moved to form such a shaped deposit as is shown in Fig. 30.

Figs. 29 to 32, inclusive, are intended to illustrate the nature and character of changes that may be made in the form of machine shown if different-shaped deposits are wanted.

The cams for operating the rod valves and the cam for operating the stopper valve constitute mechanical pattern-control valves.

It will be understood of course that as the lengthwise-grooved piston rod 26 is threaded through the nut 27, and the gear 35 is interiorly threaded to mesh with threads on the piston rod and is connected by the feather 36 slidably mounted in the lengthwise-extending groove 37 of the piston rod, rotation of the gear 35 on the piston rod carries the feather 36 against one or the other side of the groove 37, compelling the piston rod to turn either up or down in its stationary nut 27, according to the direction of rotation of the gear 35.

Many changes may be made in embodiments of this invention without departure from the invention.

Having described the principle of this invention in connection with one form of it, what I claim is:

1. In a machine for depositing an adhesive on a traveling web, the combination of a web-feeding mechanism; forwardly thereof a rotary support for the web, with an adhesive distributer having an adhesive-containing chamber provided with a narrow elongated exit opposed to the crown of the rotary support; and mechanism under the control of an operator for exerting regulated pressure on the adhesive in said chamber during the outflow of the adhesive on the traveling web; and a pair of valves for covering and uncovering said exit in whole or in part; and for each valve an automatic valve moving mechanism.

2. In a machine for depositing adhesive on a traveling web and for depositing abrasive material on a deposit of adhesive, the combination of a web-feeding mechanism, a rotary web-support, a chambered adhesive-depositing member having an exit slit parallel to the axis and opposed to the crown of the rotary web-support, and mechanism under the control of an operator for forcing adhesive out of the chamber of the adhesive-depositing member under regulated pressure for varying the speed of delivery of the adhesive; the web-feeding mechanism being operative to effect travel of the web between the web support and the adhesive-depositing member, a pair of endwise movable rod valves for said exit; and a rod valve actuating mechanism.

3. In a gluing machine, the combination of a support for material to be glued; a chambered glue-depositing member having a glue-exit opposed to and spaced apart from the support; an adhesive-container communicating with the chamber of the glue-depositing member; a rotary piston in said container; and mechanism for moving the piston to effect pressure on adhesive in the container and in the chamber of the glue-depositing member, such mechanism comprising means under the control of the operator for controlling the movement of the piston.

4. In a gluing machine, the combination of a support for material to be glued; a chambered glue-depositing member having a glue-exit opposed to and spaced apart from the support; an adhesive-container communicating with the chamber of the glue-depositing member; a piston in said container; and mechanism for moving the piston to effect pressure on adhesive in the container and in the chamber of the glue-depositing member, said mechanism comprising a change-speed gear mechanism having an operating member accessible to the operator for varying the speed and its consequent pressure on the contents of the glue depositing member.

5. The combination of a web-supporting roll; web-feeding means; a lengthwise-chambered glue-distributing crosshead having a glue-exit opposed to and spaced apart from the supporting roll to permit travel of the web between the roll and said crosshead; an adhesive-container in communication with the chamber of the crosshead; a screw driven piston for the container; and a change-speed mechanism operatively connected with the piston.

6. The combination of a web-supporting roll; web-feeding means; a lengthwise-chambered glue-distributing crosshead having a glue-exit opposed to and spaced apart from the supporting roll to permit travel of the web between the roll and said crosshead; an adhesive-container in communication with the chamber of the crosshead; a screw driven piston for the container; a change-speed mechanism operatively connected with the piston; and means for opening and closing said glue-exit.

7. In a gluing machine, the combination of a chambered glue-distributing member having an exit with an adhesive-container in communication with the chamber of the distributing member; a screw driven piston for said container; and mechanism for moving the piston in the container toward and from the bottom of the container.

8. In a gluing machine, the combination of a chambered glue-distributing member having an exit with an adhesive-container in communication with the chamber of the distributing member; a screw driven piston for said container; and mechanism for moving the piston in the container; and a change-speed mechanism for said piston-moving mechanism.

9. In a gluing machine, the combination of a chambered glue-distributing member having an exit with an adhesive-container in communication with the chamber of the distributing member; a screw driven piston for said container; and mechanism for moving the piston in the container; and mechanism for variably stopping said exit to vary the extent of its delivery of adhesive.

10. The combination of a web-support; a web-feeding means; a chambered material-depositing member having an exit opposed to and spaced apart from said support; a pair of endwise-reciprocating rod-valves for opening and closing said exit; and mechanism for automatically reciprocating said valve-rods to deliver material according to a pre-determined design.

11. The combination of a web-support; a web-feeding mechanism; a chambered glue-depositing member having an exit opposed to and spaced apart from the web-support; means for closing and varying the discharging dimension of said exit; and mechanism for actuating said means to effect deposits of adhesive in disk form on the web while it is being moved by the feeding means.

12. The combination of a web-support; a web-feeding mechanism; a chambered glue-depositing member having an exit opposed to and spaced apart from the web-support; means for varying the discharging dimension of said exit; mechanism for actuating said means to effect deposits of adhesive in disk form on the traveling web; and mechanism for variably stopping said exit to prevent adhesive from being deposited on a central arbor-hole-forming space of said disk.

13. In a gluing machine, the combination of a web-support; a web-feeding mechanism; a chambered adhesive-distributer having an exit and being constructed to deliver adhesive on the web in successive contacting transverse lines during the travel of the web; mechanism for automatically varying the extent of the exit; and arbor-hole-space-forming mechanism.

14. The combination of a lengthwise-chambered adhesive-container formed with an exit constructed to deliver adhesive on a surface of a traveling web; a web-support opposed to said exit; a web-feeding mechanism; and automatically-operating means for opening and closing said exit predetermined distances; a vertically-chambered adhesive-container communicating with said lengthwise-chambered adhesive-container and a screw-driven piston in the vertical container; and mechanism under the control of the operator for varying the movement of said piston.

15. The combination of a lengthwise-chambered adhesive-container formed with an exit constructed to deliver adhesive on a surface of a traveling web; a web-support opposed to said exit; a web-feeding mechanism; automatically-operating means for opening and closing said exit predetermined distances; and arbor-hole-space stopping mechanism for said exit.

16. The combination of a lengthwise-chambered adhesive-container having an exit constructed to deliver adhesive; a slide valve for opening and closing said exit; and a power-driven cam, operatively connected with the valve for moving the valve predetermined distances relatively to said exit.

17. The combination with means for supporting backing material for application of an adhesive to a surface of the backing; of an adhesive-depositing mechanism constructed with an exit for the adhesive, the exit being opposed to said supporting means, and the depositing mechanism comprising automatically-actuated valve mechanism for the exit constructed and operating for effecting deposit on the backing of an adhesive in disk form.

18. The combination with means for supporting backing material for application of an adhesive to a surface of the backing; of an adhesive-depositing mechanism constructed with an exit for the adhesive, the exit being opposed to said supporting means, and the depositing mechanism comprising means for effecting the deposit on the backing of an adhesive in disk form; and mechanism for stoppering said exit for formation of non-adhesive arbor-hole sections of the backing at the center of the disk of adhesive.

19. The combination with a lengthwise-chambered adhesive-distributer having an exit for the distributer of a pair of alined slide valves for said exit; mechanism for gradually separating the opposed ends of such slide valves and for moving them together, for formation of a disk of adhesive on sheet material; and mechanism for covering said exit to prevent access of adhesive to the central arbor-hole section of said disk.

20. The combination with a work-support of a thereto-opposed adhesive-distributer provided with a lengthwise-extending exit; a pair of alined movable rod-valves; mechanism for separating the opposed ends thereof and for moving such ends together, for covering and uncovering said exit by variable distances; and arbor-hole-space forming mechanism.

21. The combination of a fluid-depositing cross-head formed with an exit orifice for the fluid; a control valve for varying the quantity of fluid issuing from the exit orifice; for the control valve, a variable-speed control-valve-actuating mechanism; a fluid-supply apparatus in communication with the cross-head; mechanism for exerting pressure on the contents of the fluid-supply apparatus; and a web supporting and feeding mechanism.

22. In the combination set forth in claim 21, the mechanism for exerting pressure on the contents of the fluid-supply apparatus being a variable-speed mechanism.

23. In the combination set forth in claim 21, a stopper valve for the orifice and stopper-valve-actuating mechanism.

24. The combination with a web-feeding mechanism comprising a web support transverse to the width of the web and over which the web is drawn, of a fluid-depositing device having an exit opposed to a surface of the web; an exit opening and closing mechanism constructed to open and close the exit at predetermined times and in predetermined sequence according to a desired pattern; and a mechanical pattern-control device constructed and operating to actuate said exit opening and closing mechanism.

25. The combination of a rotary web support; a web-feeding mechanism; a stationary liquid-holder having an exit opposed to the crown of the rotary web support; a valve for opening and closing said exit; means for automatically actuating said valve during the operation of the web-feeding mechanism; mechanism for exerting pressure on the contents of the holder; and means under the control of the operator for throwing the pressure-exerting mechanism into and out of pressing relation to said contents during the movement of the web-feeding mechanism.

26. In the combination set forth in claim 25, the means for actuating said valve during the operation of the web-feeding mechanism, comprising a pattern means whereby the valve will be opened and closed to effect on the traveling web a deposit of predetermined character.

27. The combination of a web support; web-feeding mechanism; a stationary liquid-depositor having an exit opposed to said support; a pair of alined rod valves for opening and closing said exit; a pattern-cam rod-valve-actuating mechanism for each valve; and means for exerting artificial pressure on the contents of the distributer.

28. In the combination set forth in claim 27, other means for throwing the pressure means out of pressure relation to the contents of the distributer, at the will of the operator, during the movement of the web-feeding mechanism.

29. In a machine for applying glue to the surface of a traveling web, a glue container having a slot in its bottom, reciprocable rods for variably closing said slot, and means comprising cams for controlling the movement of said rods in order to produce irregular deposition of glue on the web.

30. In a gluing machine, the combination with a glue holder having a lengthwise extending exit slot of valvular mechanism for progressively uncovering and covering the slot; and mechanism for exerting pressure on the contents of the holder during operation of said mechanisms.

31. In a gluing machine, the combination with a glue holder having a lengthwise extending exit slot of a valvular mechanism for progressively uncovering and covering the slot; and a mechanism for exerting a variable pressure on the contents of the holder during the operation of said mechanisms.

32. The combination of a piston and cylinder for holding a liquid; a distributer in communication with the piston cylinder and having a lengthwise extending exit slot; a rotary piston for the cylinder; and for moving the piston in the cylinder, a mechanism under control of the operator for varying the pressure exerted by the rotary piston on the contents of the cylinder correspondingly to variations of the area of the uncovered portion of the exit.

33. The combination of the distributer having a lengthwise extending exit slot; a pair of endwise movable rod valves for such exit slot; mechanism for reciprocating such rod valves; for the exit slot, a stopper valve operative between opposed ends of the rod valves; and a stopper valve actuating mechanism.

In testimony whereof I have hereunto set my hand this 28th day of November, 1919.

HERMAN BEHR.